United States Patent [19]

Younger

[11] Patent Number: 4,790,938
[45] Date of Patent: Dec. 13, 1988

[54] FILTER FOR REMOVING PARTICULATE MATTER FROM FLUID WITHIN A MOVABLE BODY

[76] Inventor: Gilbert W. Younger, 2621 Merced Ave., El Monte, Calif. 91733

[21] Appl. No.: 822,033

[22] Filed: Jan. 24, 1986

[51] Int. Cl.$^4$ .................. B01D 27/08; B01D 35/02
[52] U.S. Cl. .................. 210/484; 210/496; 210/497.01; 210/510.1; 55/486
[58] Field of Search .................. 123/196 R, 196 A; 210/168, 416.5, 484, 488, 489, 496, 497.01, 497.2, 510.1; 55/306, 486

[56] References Cited

U.S. PATENT DOCUMENTS

| | | | |
|---|---|---|---|
| 3,210,229 | 10/1965 | Feine | 210/496 |
| 3,360,131 | 12/1967 | Witkowski | 210/496 |
| 3,378,398 | 4/1968 | Nottebohn et al. | 210/496 |
| 3,398,837 | 8/1968 | Adams | 210/496 |
| 3,567,619 | 3/1971 | Brown | 55/DIG. 13 |
| 3,784,011 | 1/1974 | Ward | 210/168 |
| 4,250,039 | 2/1981 | Cozzi et al. | 210/416.5 |
| 4,280,909 | 7/1981 | Deutsch | 210/490 |
| 4,297,212 | 10/1981 | Padgett, Sr. | 210/168 |
| 4,402,827 | 9/1983 | Joseph | 210/168 |
| 4,522,166 | 6/1985 | Toivio et al. | 123/196 A |
| 4,631,077 | 12/1986 | Spicer et al. | 55/DIG. 13 |

Primary Examiner—Richard V. Fisher
Assistant Examiner—Wanda L. Millard
Attorney, Agent, or Firm—Mark P. Stone

[57] ABSTRACT

The present invention provides an improved filtration system particularly adapted for use in a fluid circulation system in a moving body. The filtration system includes a filter body formed from a porous resilient material. The filter body is not designed to be limited to a predetermined space for a filter and thus greatly increases the filter area/mass ratio. The filter defines a large number of tapered and winding passageways which are oriented at a large number of different angles relative to the outer surface of the filter body. The passageways are sufficiently large to permit fluid and particles to flow through into them, but are sufficiently tapered so that any particulate matter within the fluid becomes entrapped in the tapered passageways. The walls of the tapered passageways are porous in micron and submicron dimension to freely pass fluid. Accordingly, fluid will freely pass through the filter but any impurities or particulate matter will be firmly retained within the tapered winding passageways. Moreover, as a result of the winding and tapered nature of the passageways defined within the filter, once particulate matter is entrapped within the filter, movement of the moving body within which the filtration system is incorporated or flow of the fluid itself will not free the entrapped particles in the tapered passageways, but further embeds them. The filter utilizes both gravitational and inertial forces to entrap particles and affirmatively prevent the recirculation of entrapped particles with the fluid carrier.

18 Claims, 3 Drawing Sheets

FILTER FOR REMOVING PARTICULATE MATTER FROM FLUID WITHIN A MOVABLE BODY

BACKGROUND ART

The present invention relates to an improved filtration system to remove particulate matter or other impurities from a flowing or stationary liquid carrier medium. More specifically, the improved filtration system is adapted to operate in an environment in which the liquid to be filtered is itself enclosed within a movable environment.

Generally speaking, filtration systems for fluids are adapted to remove metallic and non-metallic particles which would otherwise travel with a flowing or circulating fluid carrier medium. Such circulating particles cause significant wear to the components of systems due to abrasion and corrosion. It is of paramount importance to remove such particles from their carrier medium and to prevent such particles from recirculating with the fluid carrier after they have been initially removed. Without such permanent filtration, wear of system components and failure of the overall system is inevitable.

Filtration of particulate matter is difficult when the fluid to be filtered is itself incorporated in a moving body, as for example the various fluids which circulate through a motor vehicle. Although known filtration systems may initially remove particulate matter and other impurities from a fluid carrier, the abrupt stopping and starting inertial forces generated by the moving body, taken together with the circulation of the fluid itself, may free the initially entrapped particles so that they are again enabled to circulate and flow with the carrier fluid.

A further disadvantage of state of the art filters is that such filter systems are limited by way of space and weight considerations.

It is the primary object of the present invention to provide an improved filtration system capable of entrapping particulate impurities of a plurality of different sizes and dimensions and preventing recirculation of these impurities in the fluid carrier medium after they have been initially entrapped.

It is a further object of the present invention to provide an improved filtration system which efficiently operates in a movable body when the movable body is both in motion and at rest.

It is still a further object of the invention to increase the filter area many times greater than that of known filter systems without generating a corresponding increase in space or weight limitations.

Other objects and advantages of the present invention will become apparent in conjunction with the following description thereof.

SUMMARY OF THE INVENTION

In accordance with the present invention, an improved filtration system for filtering particulate matter carried by a fluid or liquid medium in a movable body is provided by the utilization of a porous, resilient material as the basic filter body. The filter body defines a large number of passageways which are both tapered in a direction into the body, and which also define curving and winding paths of travel through the passageways. The tapered passageways defined within the filter body are oriented in a large number of different angles relative to the outer surface of the filter body. The filter is mounted in a sump area or other liquid reservoir within a movable body and provides a wide surface area. As liquid enters the filter, particulate matter carried by the liquid travels through the angled tapered passageways defined within the filter body until the particulate matter reaches a diameter equivalent to the size of the particles. The particles thus becomes entrapped within the tapered passageway while the fluid continues to flow through. The winding paths defined by the various passageways further serve to slow the speed of a flowing particle before the particle becomes entrapped in a tapered section of a passageway to more effectively trap the particle. The winding path of the passageways further serves to impede the motion of a particle and prevent it from escaping the filter body in the event that the particle becomes freed from a tapered area of a passageway as a result of reversing inertial forces generated by the motion of a movable body in which the filter is incorporated. Additionally, inertial forces generated by the moving body or the flow of fluid itself tend to induce the particulate matter into the passageways of the filter body in many instances, thereby increasing the overall efficiency of operation of the filtration system.

The filter is resilient to a predetermined extent so that it moves together with the fluid carrier to be filtered. This reduces the reverse flushing effect associated with fixed filters. Thus, the filtration system advantageously utilizes inertial forces generated by movement of a movable body to both aid in entrapping particulate matter in the filter and also to prevent matter entrapped in the filter from escaping the filter and recirculating with the fluid carrier.

When both the fluid carrier and movable body are at rest, gravitational forces cause particles in the fluid carrier to descend downwardly into the sump area. These particles tend to enter the tapered winding passageways of the filter body and sink deeply therein. The tortuous nature of the passageways, together with the gravitational forces acting on the particles settled in the passageways, act as a barrier to prevent recirculation of the particles with the fluid carrier when either the movable body or the fluid itself is set in motion.

Whereas current designs require specific additionally designed space, flow passages, attachment and containment, the filter of the present invention has none of those limitations. The filter is utilized in an existing sump area which is filled so that all of the fluid is constantly being filtered except that amount which is circulating during operation for lubricating purposes.

Accordingly, although known filter systems filter less than 1% of the fluid during operation, the filter of the present invention has the potential for 90% or more continuous filtration during operation.

Although known filter systems allow particles that settle by gravity into the sump (storage area) during immobility to recirculate when motion starts, the present system is designed to affirmatively trap gravity settled particulates and prevent their recirculation.

No additional or specifically designed space is required to house the filter which is positioned in a sump area. The only containment for the filter is a wire screen or similar barrier to separate the filter media from moving parts and maintain it in a desired position within the system.

BEST MODE FOR CARRYING OUT THE INVENTION

Figure 1:
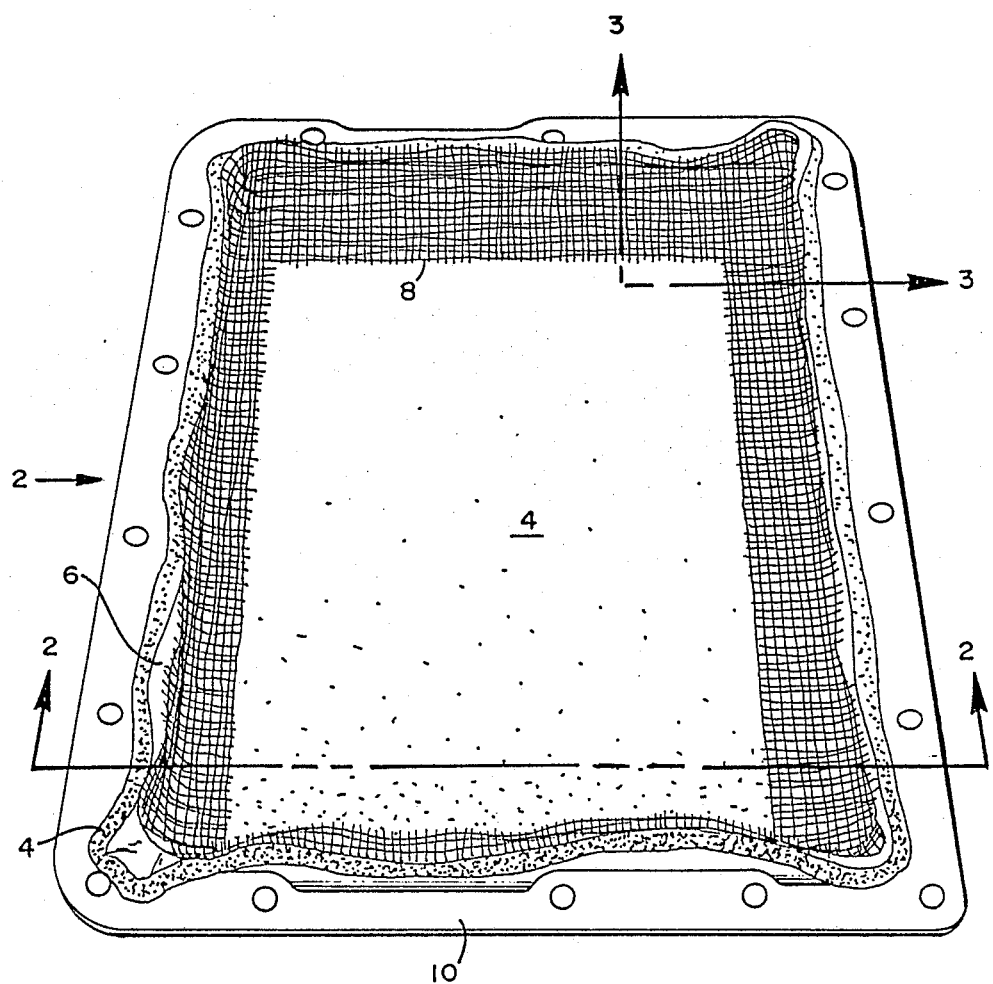
FIG. 1 of the drawings illustrates a top perspective view of a new filter in accordance with the present invention.

The improved filtration system of the present invention will be first discussed in detail with reference to FIGS. 1-3 of the drawings. FIG. 1 illustrates the new filter of the present invention which is designated generally by the reference numeral 2. The filter 2 includes a porous, resilient filter body 4 which is shown as being generally square in shape. The periphery 6 of the filter body 4 is substantially perpendicularly oriented with respect to the center portion thereof to define an upturned border. The configuration of the filter body is maintained in this position by a screen 8 and a pan 10, both of which are generally square to conform to the shape of the filter body 4.

In the preferred embodiment of the invention, the material forming the filter body 4 is high temperature urethane which is stable to a temperature of approximately 550° F. Other materials such as rubber, buna compounds (synthetic rubbers) polyacrylics, or even natural sponge may also be used as filter body material. However, these latter materials are less preferred than urethane because they are considerably less stable at high temperatures.

Figure 2:
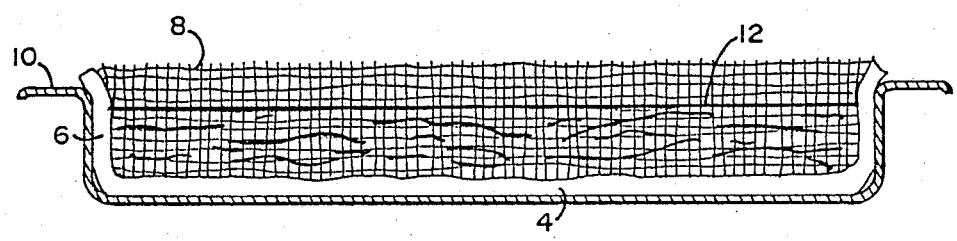
FIG. 2 diagramatically illustrates the filter of FIG. 1 mounted to the bottom of a sump.

As most clearly seen in FIG. 2 of the drawings, the filter of FIG. 1 is mounted in the pan 10 which represents a sump or other reservoir for a liquid carrier material. As shown in FIG. 2, the liquid medium generally designated by reference numeral 12 surrounds the filter body 4 which covers the entire surface area of the sump region 10. The liquid may be stationary relative to the filter, or it may be flowing relative to the filter. The filter may be mounted in a movable body such as a sump for transmission oil in a motor vehicle. When the vehicle is stationary, the fluid will be stationary relative to the filter. However, when the vehicle is in motion, the fluid will flow relative to the filter as a result of the motion of the vehicle and also as a result of circulation of the fluid itself which occurs during normal operation of the transmission system of the vehicle.

Figure 3:
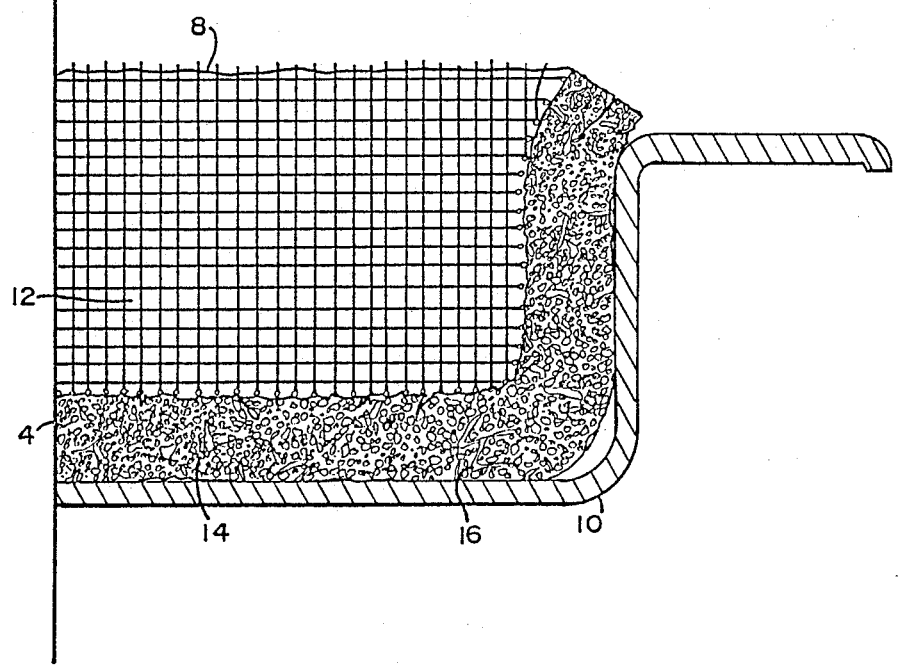
FIG. 3 illustrates a cross section of the filter showing the various tapered and winding passageways defined within the filter body illustrated in FIGS. 1 and 2.

FIG. 3 of the drawings schematically illustrates the structure of the filter body 4. As noted, the filter body is preferably formed from a urethane material. It includes a plurality of passageways 14 which are tapered in a direction inwardly towards the center of the filter body. These integrally defined passageways 14 are oriented at many different angles with respect to the outer surface of the filter body, and different groups of these passageways are interconnected internally within the filter body at different positions as shown by reference numeral 16 to define random but continuous fluid flow paths through the entire filter body. The internal tapered passageways 14 are tortuous and wind and curve in a plurality of randomly different directions and orientations. The passageways may be tapered to micron or sub-micron width. The passageways 14 may be defined in the filter body 4 by blow molding or air injection techniques which are well known to those skilled in the art, or other conventional methods for defining openings or channels in a solid mass.

Operation of the new filtration system illustrated by FIGS. 1-3 will be described as follows. It is assumed that the filter is mounted in a sump or fluid reservoir of a movable body, such as an automobile, as illustrated by FIG. 2. When the moving body is at rest, particulate matter or impurities in the fluid tend to settle at the bottom of the sump as a result of the specific gravity of the particles. However, the particles will recirculate with any movement of the fluid or liquid carrier. Such movement may result from inertial forces of the moving body itself when set in motion, and may further result from intentional circulation of the fluid in the sump, as for example by a pump. In the improved filtration system of the present invention, the filter body is oriented longitudinally across the bottom of the sump, and thus particles descending towards the bottom of the sump will tend to enter upwardly oriented openings of passageways 14 defined in the filter body and sink downwardly therein. Because the passageways 14 are both inwardly tapered and curved, the passageways present an impediment to the recirculation of the particles when the fluid medium itself is set in motion, as for example by movement of the movable body in which the filtration system is incorporated. Thus, the filtration system tends to entrap particles and prevent re-entry into the carrier fluid even when the fluid is at rest.

When the fluid medium is set in motion, the inertial forces generated thereby tend to drive particles already within the passageways to the deeper more tapered portions of those passageways. When a particle reaches an area in a passageway having a diameter equal to or less than the largest dimension of the particle itself, the particle will become entrapped or embedded in the soft sidewalls of this tapered area to prevent the particle from being carried further by the fluid medium. Therefore, each passageway 14 is capable of filtering different particles of different sizes. The tortuous configuration of the passageways 14 tend to decrease the speed of the particles flowing through the passageways with the fluid medium to enhance the entrapment of the particles which cannot change direction as readily as its fluid carrier medium and thus will impact against the softer sidewalls of the passageways and become embedded therein. Moreover, the tortuous configuration of the passageways increase the length of the passageways and the time for fluid to flow through them, thereby increasing the probability of entrapping a large number of particles. Thus, the tapered configuration of the passageways 14 cooperate with the winding orientation of the passageways to assure firm particle entrapment within the filter body.

The most tapered portions of the passageways 14 are sufficiently large to permit fluid flow through them but will still trap particles having dimensions corresponding to the diameter of the tapered passageway. In most instances, the fluid carrier medium will flow around a trapped particle in a passageway which does not completely block the fluid flow. Various groups of passageways 14 are interconnected within the filter body at different locations to enhance the overall flow of the carrier medium through the filter body by providing substantially continuous paths for fluid flow. Moreover, because the filter body is formed from a urethane material which is generally softer than the particles to be entrapped (e.g. metal chips), the particles will easily penetrate the filter body at the tapered or winding portions of the passageways 14 to assure that these particles remain firmly embedded within the filter body.

The tortuous and tapered paths defined by the passageways 14 provide different areas of high and low pressure and speed relative to a particle traveling with a liquid carrier medium through the filter. The passageways thus define a structure which is adapted to readily trap particulate matter and prevent recirculation of such matter after it has been trapped. The filter body 4 provides a wide surface area relative to the area of the sump or resevoir in which the filter body is mounted. A liquid carrier encountering the wide surface area of the filter body will effectively be dispersed by the filter body and thus decrease in speed. This decrease in speed is experienced at all angles relative to the filter body since the surface area of the filter body itself is orientated along different planes in the sump. As illustrated in FIGS. 1 and 2, the filter body includes a wide central surface area oriented along a plane parallel to the bottom surface of the sump. However, the filter body includes an upturned peripheral portion 6 which is oriented perpendicularly to the bottom surface of the sump. Moreover, as discussed above, the various passageways defined within the filter body are randomly oriented at many different angles relative to the outer surfaces of the filter body. The decrease in speed experienced by a liquid medium entering the filter body tends to slow the speed of any particles carried with the flowing liquid. This decrease in speed enhances the entrapment of particles within the tapered portions of the passageways 14 defined in the filter body. Additionally, as a result of the decreased speed of the particles carried with the flowing liquid, the specific gravity acting upon the particles causes the particles to descend downwardly into the passageways 14. The further down that the particles descend into the passageways, the more unlikely it is that the particles will escape the filter body because of the tortuous configuration of the passageways 14.

The filter body 4 is formed from a material which is resilient in nature to a limited extent. This material will initially move with the carrier liquid as a result of inertial forces generated by the moving body and/or carrier medium when initially set in motion. This surface flexibility of the filter body 4 provides relative speed to the carrier and prevents the deflection of particles by the outer surfaces of the filter body which would otherwise occur if the filter body were fixed stationary to the carrier fluid when the carrier fluid is set in motion. However, because the filter body is mounted in a fixed position relative to the fluid by the retaining screen 8, the extent of resiliency or movement of the filter body is momentary in nature and caused only by initial movement or change in speed of the carrier fluid or the movable body. Thus, although the filter body 4 initially moves with the carrier fluid when the fluid is set in motion or changes speed, this movement will abruptly stop and the filter will return to its initial orientation. When this occurs, particles flowing with the fluid are abruptly injected deeply into the tapered passageways of the filter body as a result of the continued and increased relative flow of the fluid and the particles carried therein through the passageways 14 in the filter body. The resiliency of the filter body, which causes it to return to its initial position in further opposition to the direction of flow of the fluid medium and particles carried therein, further guides flowing particles into the deep tapered portions of the passageways where they will be trapped. Thus, the resiliency of the filter body both prevents initial deflection of particles during a change in speed of the fluid velocity relative to the filter, and further provides a moving environment to effectively "induce" particles traveling with the liquid medium to enter the deep internal tapered portions of passageways 14 where they become trapped. Preferably, the weight of the filter substantially corresponds to the weight of the fluid medium to enable the filter to readily initially move with the fluid at the same speed as the fluid.

As illustrated in FIG. 2 of the drawings, in operation, the filter body 4 is immersed in a liquid medium 12. The trough-shaped configuration of the filter body 4 effectively provides a pool for this liquid which is to be filtered. As discussed herein, particles in the liquid in the center of the filter body will either sink downwardly into the passageways in the filter body as a result of specific gravity acting upon the particles (when the liquid particles are at rest), or will be injected into the various passageways in the center portion of the filter body or its upturned sidewall 6 as a result of either inertial forces acting upon the particle or as a result of forced circulation of the liquid through the filter body. However, the upturned sidewall of the filter body provides further means for trapping particles in the carrier liquid. During lateral movement of the liquid relative to the filter body, much of the liquid will flow through the tapered passageways in the upturned sidewalls of the filter body which will be generally perpendicular to the direction of fluid flow. However, a portion of the liquid may flow over or around the sidewalls. Because the particulate matter carried in the liquid is heavier than the liquid itself, the particulate matter will be prevented from flowing over the sidewall as a result of gravitational forces acting downwardly on the particles and the inertial movement of the particles themselves. The combined gravitational and inertial forces impede particle flow over the edge of the sidewall which acts as a physical barrier. Thus, the particles are effectively injected into the sidewall to be entrapped in the tapered passageways defined therein while fluid freely passes through the sidewall.

It thus becomes apparent that the improved filtration system of the present invention provides a filter body that not only removes particles or impurities of many differing sizes and configurations from a flowing liquid medium, but is purposely designed to prevent re-entry of filtered particles into the carrier fluid. The prevention of recirculation of particles is important in the present filtration system which is adapted to be used in a moving body which is otherwise capable of generating inertial forces sufficient to free initially trapped particles. The filtration system operates to trap particles when the liquid carrier is both stationary relative to the filter or in motion relative to the filter. The design of the filter advantageously utilizes inertial forces generated by a moving body or the flowing fluid itself to initially trap and permanently remove particles from a fluid carrier without substantially effecting the flow of the fluid through the filter.

Figure 4:
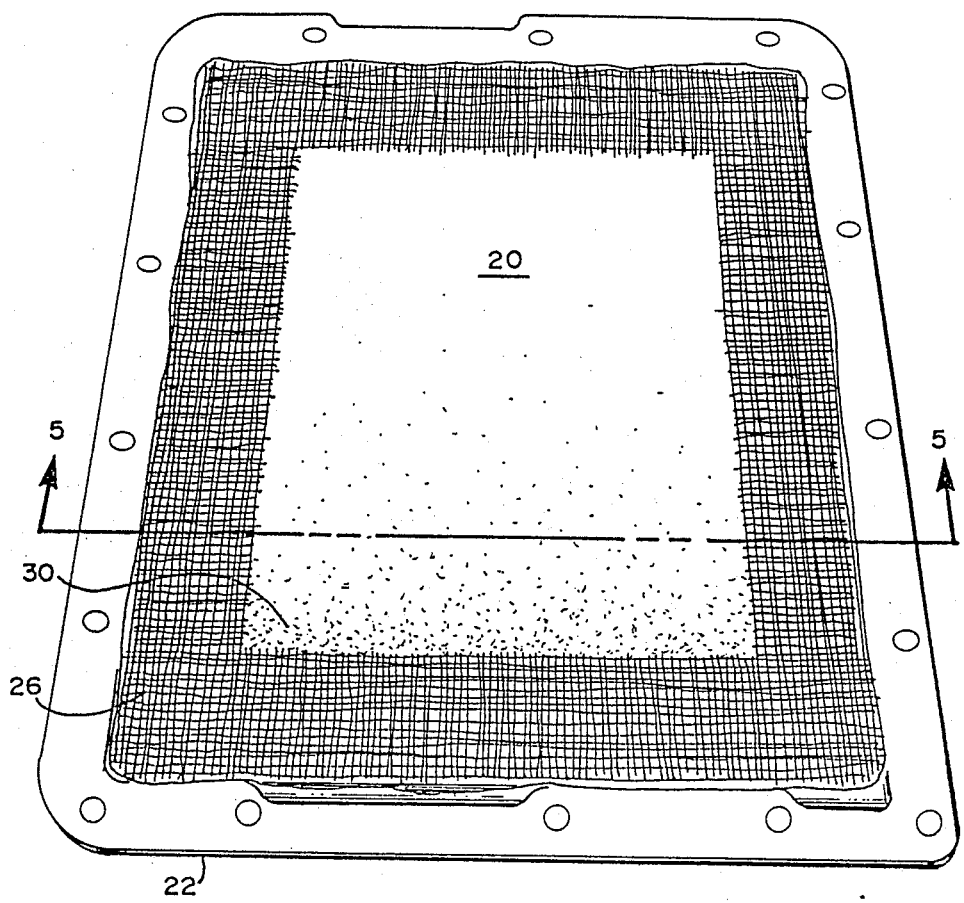
FIG. 4 illustrates a perspective view of a second related embodiment of the invention.
Figure 5:
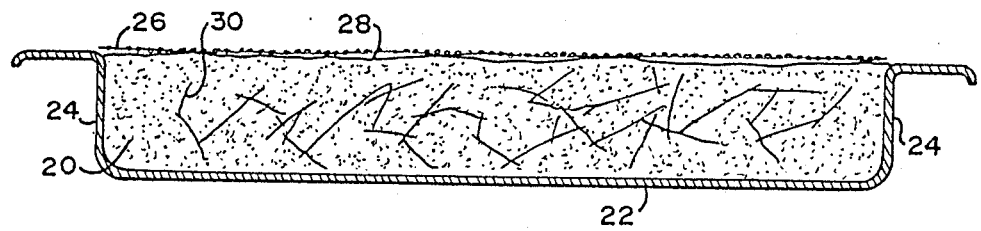
FIG. 5 illustrates a cross section of FIG. 4.

FIGS. 4 and 5 of the drawings illustrate a second preferred embodiment of the subject invention, which is similar in nature and function to the embodiment illustrated by FIGS. 1–3. In the embodiment illustrated by FIGS. 4–5, a solid filter body 20, formed from the same material and having the same internal structure as the filter body described with respect to FIGS. 1–3, is received within a sump area represented by a pan 22. The basic difference between this latter embodiment of the invention and that illustrated by FIGS. 1–3 is that in the latter embodiment, the mass of the filter body fills the entire sump area and is level with the top thereof. The filter body 20 is configured in a solid geometrical shape, preferably square or rectangular depending on the shape of the sump area. The advantage of this embodiment is that because the filter body fills the entire sump area, the filtering of fluid passing therethrough will be more efficient as a result of the greater filter body mass. Moreover, since the filter body fills the entire sump area, the end walls 24 of the sump serve as retaining means and no retaining screen is required at those ends of the filter body. However, as in the embodiment illustrated by FIGS. 1–3, a screen 26 is mounted proximate to the upper surface 28 of the filter body to function as retaining means for the filter body in a vertical orientation. The retaining screen 26 forms a frame around the periphery of the exposed upper surface of the filter body 20, the central portion thereof being entirely exposed as illustrated in FIG. 4.

As discussed in more detail with respect to FIGS. 1–3, the filter body of FIGS. 4–5 is resilient, porous and defines a plurality of tapered, randomly oriented and randomly interconnected passageways 30 which will permit continuous flow of fluid therethrough but will entrap or embed particulate matter carried by the fluid. The many advantages described with respect to the embodiment of FIGS. 1–3 of the drawings are equally applicable to the embodiment illustrated by FIGS. 4 and 5 of the drawings. As noted above, the FIGS. 4–5 embodiment is additionally advantageous because it provides greater filter body mass which will inherently result in a more efficient filtering operation.

In both embodiments of the invention, the randomly oriented, tapered passageways defined in the filter body effectively entrap or embed particulate matter to be filtered from the carrier fluid without substantially obstructing fluid flow through the filter body. The passageways are randomly interconnected to provide different continuous channels for fluid flow. The different passageways may be tapered to micron or submicron sizes so that the most tapered portions thereof will entrap particulate matter of dimensions of that magnitude which become embedded in the sidewalls of the passageways, but will not substantially impede the flow of fluid through the continuous channels defined in the filter body by the randomly interconnected, tortuous, tapered passageways. In most instances, fluid will readily flow around any trapped particulate matter embedded in any passageway. Because the trapped particulate matter is embedded within the softer filter body material, the entrapped particles will not be freed, in most instances, by the flow of fluids through the filter body or by other inertial forces generated by fluid or filter movement. Moreover, because the particles are entrapped in tapered passageways, each passageway is itself capable of filtering many different particles of varying size and shape.

As discussed more fully above, the filter system of the present invention is particularly adapted to be incorporated within a movable body, and more particularly within a movable body in which fluid is independently circulated while the body is in motion. The filtration system is designed, as discussed, to advantageously utilize inertial forces generated by both change in movement of the movable body, and/or movement or flow of fluid through the filter body itself independent of the movement of the movable body, to effectively entrap particulate matter and prevent the release of such entrapped particulate matter back into circulation with the fluid. The filtration system is particulary useful in an automobile or other motor vehicle which requires circulation and filtration of various fluids when the automobile is both at rest and in motion. In particular, the invention is useful as a filter for transmission fluid, but may also be adapted for use as an oil filter, or may be used for filtering any sump area. It is apparent that the filtration system of the present invention is not limited to motor vehicles, but may be effectively used in a wide variety of other applications.

The above description of the preferred embodiments of the invention is intended to be illustrative only, and not restrictive of the scope of the invention, that scope being defined by the following claims and all equivalents thereto.

I claim:

1. A filter for removing particulate matter from liquid within a movable body, said filter including:
   a filter body defining a porous unitary mass having an outer and an inner surface defined thereon,
   said filter body being formed from a resilient material,
   said filter body having a plurality of passageways defined between said inner and outer surface, said passageways extending to all portions of said outer surface area of said filter body and terminating in openings in said outer surface,
   said passageways tapering continuously in a direction from said outer surface towards said inner surface of said filter body, and
   said filter permitting simultaneous flow of liquid entering said filter body from any area of said outer surface through a plurality of said passageways.

2. The filter of claim 1 wherein said passageways are tortuous in nature.

3. The filter as claimed in claim 2 wherein said tapered and tortuous passageways are randomly oriented at different angles relative to the outer surfaces of the filter body.

4. The filter as claimed in claim 1 wherein said filter body is formed from high temperature urethane.

5. The filter as claimed in claim 1 wherein a plurality of said passageways are interconnected to each other at positions within said filter body to define a continuous path of flow for liquid through said filter body.

6. The filter as claimed in claim 1 wherein said filter body is formed in the shape of trough having a planar central portion and an upturned peripheral sidewall substantially normal to the orientation of said planar central region.

7. The filter of claim 1 wherein said filter body is formed in a solid geometric configuration.

8. The filter as claimed in claim 1 wherein the weight of said filter body substantially corresponds to the weight of the liquid to be filtered.

9. The filter as claimed in claim 1 wherein each of said tapered passageways are dimensioned to entrap particles of differing sizes at different portions of said tapered passageway which correspond to the respective sizes of said particles.

10. The filter as claimed in claim 1 wherein said resilient material is initially movable with said liquid to be filtered as a result of inertial forces generated by a change in motion of either said movable body or said liquid to be filtered.

11. The filter as claimed in claim 1 further including retaining means for said filter body.

12. The filter as claimed in claim 11 wherein said retaining means includes a screen positioned over at least a portion of one of said inner or outer surfaces of said filter body for retaining said filter body in a predetermined position within predetermined limits of resilient, inertial movement of said filter body.

13. The filter as claimed in claim 1 wherein said filter body is formed from a porous urethane material.

14. The filter as claimed in claim 1 wherein some of said tapered passageways are oriented upwardly to trap particulate matter settling in said filter body as a result of gravitational forces.

15. The filter as claimed in claim 1 wherein said resilient material from which said filter body is formed allows particulate matter in said liquid to be filtered to become at least partially embedded within said resilient material to prevent recirculation of said particulate matter with said liquid.

16. In a filter system for removing particulate matter from a liquid medium in a movable body, the improvement comprising:
said filter including a filter body defining a porous unitary mass having a plurality of outer surfaces, at least one inner surface, and a plurality of internal passageways defined between said inner and outer surfaces and tapering continuously in a direction from the outer surfaces of said filter body towards said at least one inner surface,
said passageways being tortuous in nature and being oriented at a plurality of different angles relative to said outer surfaces of said filter body, said passageways extending to said outer surfaces of said filter body to permit liquid to flow through said filter body from any of said outer surfaces,
said filter body being formed from a resilient material so that said filter body is movable, to a predetermined extent, as a result of inertial forces generated by a change in motion of either the liquid to be filtered or the movable body, and
said filter body being designed to utilize inertial and gravitational forces to entrap particulate matter therein and to prevent recirculation of said particulate matter.

17. The filter system as claimed in claim 16 wherein said filter body includes a planar central portion seated in a sump and a peripheral portion extending upwardly from said central portion at an angle substantially perpendicular thereto, said peripheral portion of said filter body being substantially transverse to the flow of liquid through said sump for entrapping particulate matter carried by said liquid as it flows through said peripheral portion of said filter body.

18. The filter system as claimed in claim 17 wherein said filter body is of sufficient mass to substantially fill said entire sump.

* * * * *